United States Patent
Batzler

(10) Patent No.: US 10,751,827 B2
(45) Date of Patent: Aug. 25, 2020

(54) VARIABLE SPEED ENGINE DRIVEN GENERATOR FOR PROVIDING WELDING AND AUXILIARY POWER

(71) Applicant: Illinois Tool Works Inc., Glenview, IL (US)

(72) Inventor: Todd Gerald Batzler, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 831 days.

(21) Appl. No.: 15/245,885

(22) Filed: Aug. 24, 2016

(65) Prior Publication Data

US 2018/0056426 A1 Mar. 1, 2018

(51) Int. Cl.
*B23K 9/10* (2006.01)

(52) U.S. Cl.
CPC .......... *B23K 9/1043* (2013.01); *B23K 9/1006* (2013.01); *B23K 9/1081* (2013.01)

(58) Field of Classification Search
CPC ... B23K 9/1043; B23K 9/1006; B23K 9/1081
USPC .................................. 219/133, 134, 130.21
See application file for complete search history.

(56) References Cited

U.S. PATENT DOCUMENTS

| 5,968,385 | A | * | 10/1999 | Beeson | ................ | B23K 9/1006 |
| | | | | | | 219/130.21 |
| 6,175,217 | B1 | | 1/2001 | Da Ponte et al. | | |
| 6,987,242 | B2 | | 1/2006 | Geissler | | |
| 7,049,546 | B2 | | 5/2006 | Thommes | | |
| 10,099,308 | B2 | * | 10/2018 | Vogel | ................... | B23K 9/1081 |
| 2007/0181547 | A1 | * | 8/2007 | Vogel | ................... | B23K 9/1081 |
| | | | | | | 219/130.1 |

(Continued)

FOREIGN PATENT DOCUMENTS

| AU | 5711999 A | 5/2000 |
| EP | 1981676 A1 | 10/2008 |

OTHER PUBLICATIONS

International Search Report, dated Jan. 9, 2018, European Patent Office, Rijswijk, Netherlands.

(Continued)

*Primary Examiner* — Ibrahime A Abraham
*Assistant Examiner* — Biniam B Asmelash
(74) *Attorney, Agent, or Firm* — McAndrews, Held & Malloy, Ltd.

(57) ABSTRACT

A method and apparatus for providing welding-type power derives motive power from a variable speed engine and driving a variable frequency generator with the motive power to provide a generator output. The generator output is preregulated to provide an intermediate signal, and the preregulating is controlled at least in response to feedback indicative of the welding-type output power. Welding-type output power is derived from the bus, and controlled at least in response to the welding feedback. Auxiliary output power is also derived from the bus, and controlled at least in response to feedback indicative of the auxiliary output power. The speed of the engine is controlled at least in response to one of the auxiliary feedback and the welding feedback. Energy produced by the engine that is not used as an output is stored by batteries. When the output exceeds the energy generated, the difference is supplied by the batteries.

9 Claims, 5 Drawing Sheets

(56) References Cited

U.S. PATENT DOCUMENTS

2009/0230941 A1 9/2009 Vogel
2011/0006046 A1 1/2011 Albrecht

OTHER PUBLICATIONS

Int'l Search Report and Written Opinion Appln No. PCT/US2017/048194 dated Jan. 9, 2018 (14 pgs).

* cited by examiner

VARIABLE SPEED ENGINE DRIVEN GENERATOR FOR PROVIDING WELDING AND AUXILIARY POWER

FIELD OF THE INVENTION

The present disclosure relates generally to the art of welding type power supplies that include an engine driven generator.

BACKGROUND OF THE INVENTION

There are many known types of welding-type power supplies. Welding-type power, as used herein, refers to power suitable for welding, plasma cutting, induction heating, CAC-A and/or hot wire welding/preheating (including laser welding and laser cladding). Welding-type systems are often used in a variety of applications and often include an auxiliary output to mimic utility power for powering tools, lights, etc. Welding-type system, as used herein, is a system that can provide welding type power, and can include control and power circuitry, wire feeders, and ancillary equipment. Utility power, as used herein, is power provided at a voltage and frequency by an electric utility.

Welding-type systems are often used in a variety of applications and often are used at sites where utility power is not available or insufficient. In such applications welding type systems include, or receive power from, an engine driven generator. Engine driven generators that are part of welding type systems often attempt to mimic utility power because the welding type power supply portion of the system is often designed to be used with either utility or engine power. Also, such systems typically provide an auxiliary output for tools etc.

One prior art welding power supply that is well suited for portability and for receiving different input voltages is a multi-stage system with a preregulator to condition the input power and provide a stable bus, and an output circuit that converts or transforms the stable bus to a welding-type output. Examples of such welding-type systems are described in U.S. Pat. No. 7,049,546 (Thommes) and U.S. Pat. No. 6,987,242 (Geissler), and US Patent Publication 20090230941 (Vogel), all three of which are owned by the owner of this invention, and hereby incorporate by reference. Miller® welders with the Autoline® feature include some of the features of this prior art.

Providing welding-type power, and designing systems to provide welding type power, provides for some unique challenges. For example, power supplies that are not designed for welding-type outputs are typically designed for relatively steady loads. Welding, on the other hand, is a very dynamic process and numerous variables affect output current and load, such as arc length, electrode type, shield type, air currents, dirt on the work piece, puddle size, weld orientation, operator technique, and the type of welding process determined to be most suitable for the application. These variables constantly change, and lead to a constantly changing and unpredictable output current and voltage. Moreover, welding type systems should provide auxiliary power at a constant and steady voltage, to properly mimic utility power. Finally, power supplies for many fields are designed for low-power outputs. Welding-type power supplies are high power and present many problems, such as switching losses, line losses, heat damage, inductive losses, and the creation of electromagnetic interference. Accordingly, welding-type power supply designers face many unique challenges.

Welding-type systems with engine driven generators also face the challenges above. The prior art typically used conventional engine driven generators that were not designed to address the problems unique to welding type systems. Accordingly, such prior art welding type systems had generators that were capable of providing the peak power needed for welding. When welding was being performed the engines operated at a run speed. When welding was not being performed the engines idled. When the engine was running at run speed and welding at less than the maximum output was being performed, energy was being wasted. Thus, these prior art systems were inefficient, especially when running at full speed for less than the maximum output.

Given the dynamic load of welding, it is challenging to match the power generated to the power consumed by the welding and auxiliary operations. The speed of the engine in welding systems has been controlled in response to the load, and one such system is shown in U.S. Pat. No. 5,698,385, entitled ENGINE DRIVEN INVERTER WELDING POWER SUPPLY, issued to Beeson et al. These systems were a significant advance over the prior art, because the engine could run faster (and produce more power) when needed. Prior art systems typically used separate stators for welding an auxiliary power, and as such were relatively complex and expensive.

However, the load can change much faster than the engine speed can change. Thus, it can be difficult for the system to compensate for load changes by simply controlling engine speed. Prior art systems needed to be able to quickly provide the maximum power, so they often ran at speeds capable of producing more power than was needed. Also, as the speed changed, particularly as the speed was decreasing, power was wasted.

Much of the prior art accommodated the unique needs of welding with designs that provided the peak power needed by welding. However, constantly running a generator to provide its peak output means the system is outputting more power than needed. The engine is running faster, and more fuel is being consumed. Some systems used multiple speeds, such as run and idle, so that the peak is provided only at certain times. But, given the nature of welding, this still results in periods where the engine is running faster than necessary, or worse, when the engine and system fail to provide the needed power.

Welding processes are often started using a hot start, where additional output power is provided to start welding. The engine might produce enough power at the idle speed for steady state welding, but the additional power needed for a hot start is not available at idle. Thus, the engine speed must be increased to run to provide the power for the hot start. For example, some prior art engine driven welding-type systems idle at 1800 RPM and run at 3600 RPM. Assuming, the user select a nominal steady state output current of 150 A, and a nominal arc voltage of 26V for welding with a ⅛" 7018 stick electrode, a prior art system could provide the power to weld at 150 A at an idle speed of 1800 RPM. But a hot start might require an additional 150 A (for a total of about 300 A for a duration of about 150 msec (the hot start time), which is more than the power available at idle speed. Thus, prior art systems would increase to the run speed to perform the hot start—even though the hot start is for a relatively short duration.

Accordingly, an engine driven welding type system is desired that more efficiently produces the energy needed for the welding and auxiliary operations. Preferably, such as system runs at a desired speed, and has energy storage to temporarily absorb or provide energy to the weld when the weld power demand changes faster than the power provided by the engine/generator can be changed.

SUMMARY OF THE PRESENT INVENTION

According to a first aspect of the disclosure a welding-type power supply includes a variable speed engine, a variable frequency generator, a preregulator, a welding-type output power circuit, an auxiliary power circuit, and a controller. The variable speed engine provides motive power and powers the generator. The generator provides a generator output to the preregulator, which in turn provides an intermediate signal to a bus. The welding-type output power circuit receives power from the bus and provides welding-type output power. The auxiliary power circuit receives power from the bus and provides auxiliary output power. The controller controls the system and receives welding feedback indicative of the welding-type output power, auxiliary feedback indicative of the auxiliary output power, and engine feedback indicative of the engine RPM. The controller has a welding control output connected to the welding-type output power circuit, an auxiliary control output connected to the auxiliary power circuit, an engine control output connected to the engine, and preregulator control output connected to the preregulator. The controller includes a welding control module that receives at least the welding feedback and provides the welding control output in response thereto to the welding-type power circuit, and can limit the welding-type output power in response to engine RPM. The controller also includes an auxiliary control module that receives at least the auxiliary feedback and provides the auxiliary control output in response thereto, to the auxiliary power circuit, and can limit the auxiliary output power in response to engine RPM. The controller also includes an engine control module that receives at least the welding feedback and the auxiliary feedback and provides the engine control output to the engine in response thereto, to control the engine speed. The controller further includes a preregulator control module that receives at least the welding feedback and the engine feedback and provides the preregulator control output in response thereto, to the preregulator, and can limit the power provided to the bus in response to engine RPM.

According to a second aspect of the disclosure a method of providing welding-type power includes deriving motive power from a variable speed engine and driving a variable frequency generator with the motive power to provide a generator output. The generator output is preregulated to provide an intermediate signal to a bus, and the preregulating is controlled at least in response to welding feedback indicative of the welding-type output power. Welding-type output power is derived from the bus, and controlled at least in response to the welding feedback indicative of the welding-type output. Auxiliary output power is also derived from the bus, and controlled at least in response to auxiliary feedback indicative of the auxiliary output power. The speed of the engine is controlled at least in response to one of the auxiliary feedback and the welding feedback.

The welding-type power supply includes an energy storage device and a bidirectional charger/discharger connected between the bus and the energy storage device in one alternative.

The controller includes a user override input provided to the engine control module, to override the engine speed control and cause the engine to run at a steady state maximum RPM in another embodiment.

The engine control module calls for an increased engine speed when a welding process or auxiliary process is initiated in one embodiment.

The controller limits the welding type and/or auxiliary output if the engine speed is less than a desired speed in another alternative.

The energy storage device includes at least one of a battery and a capacitor, and/or a lead acid battery, in various embodiments.

The energy storage device is able to store an amount of energy that is at least as much as an acceleration deficit for one of accelerating from off to an idle speed, or the acceleration deficit for accelerating from off to a steady state maximum speed, or the acceleration deficit for accelerating from the idle speed to the maximum steady state speed, or a hot start energy, in another alternative.

Other principal features and advantages of will become apparent to those skilled in the art upon review of the following drawings, the detailed description and the appended claims.

Figure 1:
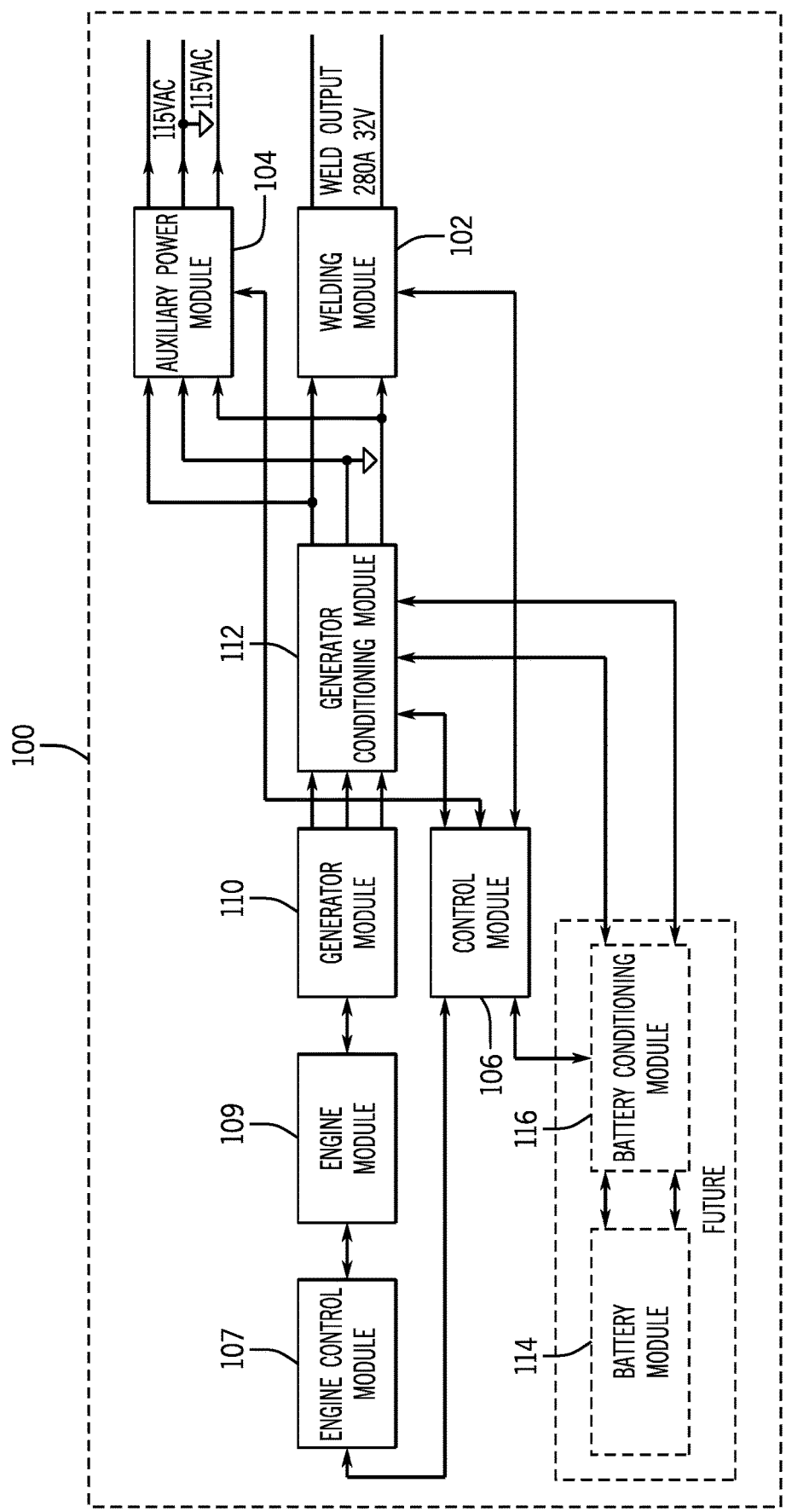
FIG. 1 is a block diagram of a welding type system in accordance with the preferred embodiment.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular components and control schemes, it should be understood at the outset that the engine-driven welding type system described herein can also be implemented with other components and control schemes.

The preferred embodiment is an engine driven welding type system that includes an engine, a generator, a welding-type power circuit, an auxiliary power circuit, an energy storage system and a controller. The controller preferably controls the system to be energy efficient. Engine-driven welding type power system, as used herein, includes one or more of the engine, the generator, and the power supply. Welding-type output power circuit, as used herein includes, the circuitry used to deliver welding-type power to the output studs. Auxiliary power circuit, as used herein includes, circuitry used to provide auxiliary output power. Controller, as used herein, includes digital and analog circuitry, discrete or integrated circuitry, microprocessors, DSPs, FPGAs, etc., and software, hardware and firmware, located on one or more boards, used to control all or part of a welding-type system or a device such as a power supply, power source, engine or generator.

Welding-type output power, as used herein, refers to power suitable for welding, plasma cutting, induction heating, CAC-A and/or hot wire welding/preheating (including laser welding and laser cladding). Welding-type power supply or system, as used herein, includes any device capable of supplying welding, plasma cutting, induction heating, CAC-A and/or hot wire welding/preheating (including laser welding and laser cladding) power, including resonant power supplies, quasi-resonant power supplies, etc., as well as control circuitry and other ancillary circuitry associated therewith. Auxiliary output power, as used herein includes, power provided to mimic utility power, such as 50/60 Hz, 120/240/200V, e.g., that can be used to power devices such as tools, lights, etc.

When the amount of power being produced by the engine and generator exceeds the instantaneous power needed for the welding type power output and the auxiliary power output, the excess energy is stored in the energy storage system. For example, when running at steady state the power produced may be more than that needed, or when the load suddenly decreases, the power produced will exceed the power needed until the engine speed is reduced. That excess energy is stored, rather than dissipated or otherwise lost.

A preferred welding-type power supply includes a variable speed engine and a variable frequency generator driven by the engine. The output of the generator is fed to a preregulator which provides intermediate power to a bus. A welding-type output power circuit receives power from the bus and provides a welding-type output power. Auxiliary power is derived from the bus by an auxiliary power circuit. The system is controlled by a controller that preferably receives feedback indicative of the welding-type output power, and feedback indicative of the auxiliary output power, and feedback indicative of the engine RPM. In response the controller controls the welding-type output power circuit, the auxiliary power circuit, the preregulator, and the engine control output connected to the engine. To provide this control the controller includes a welding control module that receives at least the welding output feedback, an auxiliary control module that receives at least the auxiliary feedback, an engine control module that receives at least the welding feedback and the auxiliary feedback, and a preregulator control module that receives at least the welding feedback and the engine feedback. The controller preferably includes a generator control module that receives at least one of the auxiliary feedback and the welding feedback.

Control module, as used herein, may be digital or analog, and includes hardware or software, that performs a specified control function. Preregulator as used herein, includes circuitry such as rectifiers, switches, transformers, SCRs, etc that process input power and/or software, control circuitry feedback circuitry, communication circuitry, and other ancillary circuitry associated therewith.

Figure 5:
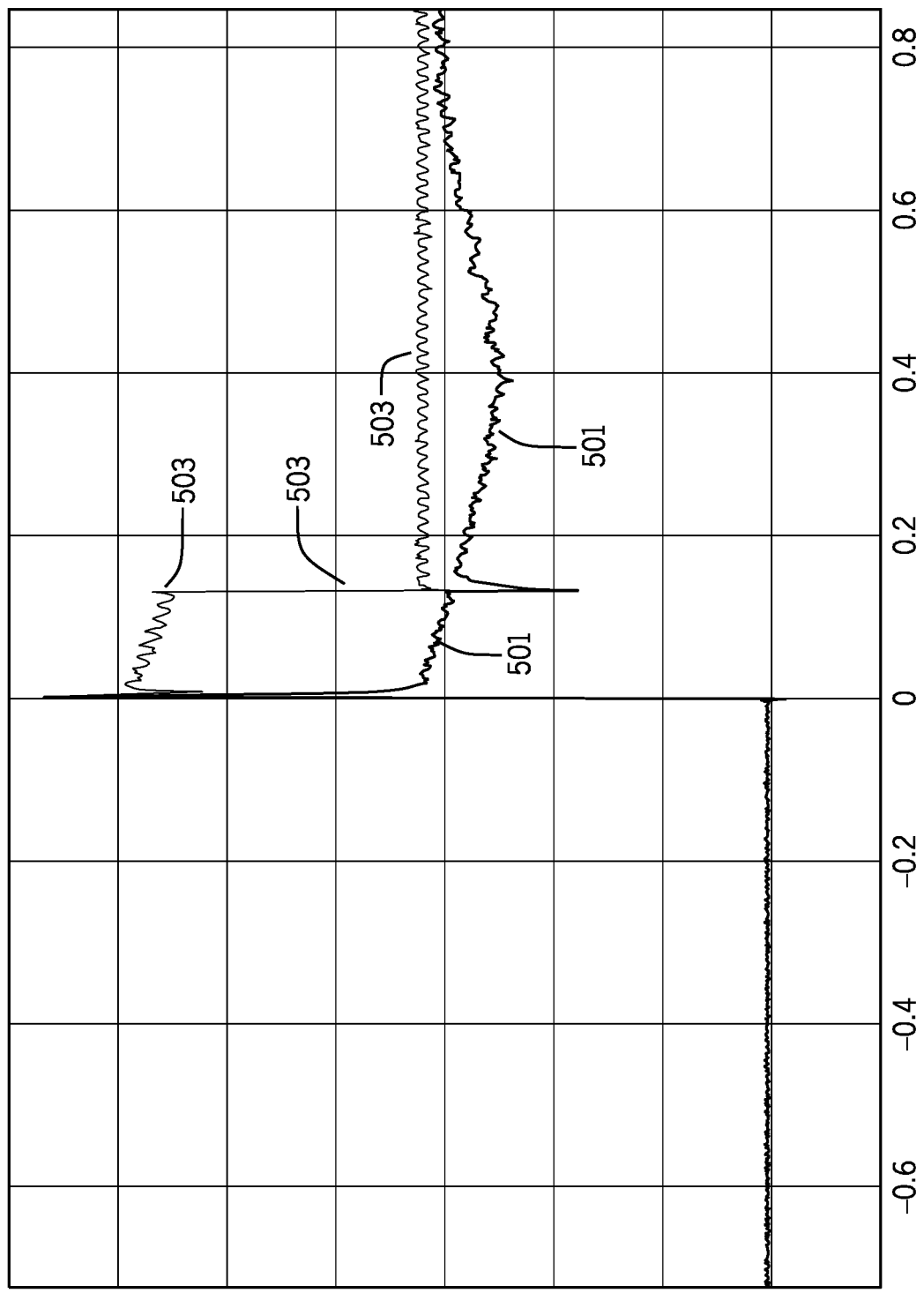
FIG. 5 is a graph showing an energy deficit for a hot start.

An energy storage device is provided that preferably is able to store an amount of energy that allows the system to provide a welding hot start without having the engine RPM increase from a lower RPM (such as an idle RPM) to a higher RPM (such as a run RPM). The additional energy needed for the hot start (the additional current multiplied by the output voltage multiplied by the hot start duration) is referred to herein as the hot start energy. FIG. 5 is a graph showing the energy needed for starting with and without a hot start. Trace 501 shows starting without a hot start, and the engine can provide the output needed for the start and steady state welding at an idle RPM. Trace 503 shows the energy needed for a hot start and then steady state welding. The additional energy needed for the hot start (the area between trace 501 and trace 503) is provided by the battery, so that the engine does not need to increase to run RPM for the hot start. The preferred embodiment provides that the energy storage device can store at least the hot start energy—so that a hot start can be provided without the engine speed increasing from a lower (idle) speed to a higher steady state maximum speed (run).

For example, given a nominal welding current of 150 A (at 26V), a typical hot start for a ⅛" 7018 stick electrode would require an additional 300 A for about 150 msec. Thus the hot start energy is 150 A*26V*150 msec, or about 585 W. The energy storage device should provide at least this amount so that the hot start can be provided at idle. This is about 6% of a typical machine's steady state rated output (10 KW). Thus, one embodiment provides that the energy storage device can provide at least 5%, 10% or 20% of the energy the generator can provide at steady state for a hot start duration.

Various embodiments provide that the energy storage device is able to store an amount of energy that is needed to provide full power on-demand. As the engine accelerates (from zero or a low RPM) to the run or full RPM, the engine cannot produce as much power as it can after it reaches full RPM. The accumulated difference between the actual power the engine provides while accelerating and the energy the engine can provide at full RPM for the acceleration duration is referred to herein as the acceleration deficit. One embodiment provides a user override input to the controller, and to the engine control module, that causes the engine to run at a steady state maximum RPM. This allows the user to run the system in a mode similar to prior art systems.

One embodiment provides that the energy storage device stores at least the acceleration deficit for accelerating from idle to run, so that the maximum steady state power can be provided while the engine accelerates from idle to run. Another embodiment provides that the energy storage device stores at least the acceleration deficit for accelerating from off to idle, so that the idle steady state power can be provided while the engine accelerates from off to idle. Another embodiment provides that the energy storage device stores at least the acceleration deficit for accelerating from off to run, so that the maximum steady state power can be provided while the engine accelerates from off to full RPM. This allows for the welding process to be initiated even when the engine is not running or running at lower speed. For example, assuming a linear acceleration, while the engine accelerates from off to zero the engine provides half the energy (relative to maximum steady state output) for the start up duration. Thus, the energy storage device would need to store an amount of energy equal to (maximum steady state power)*(start up duration). Start up duration, as used herein, refers to the time it takes the engine to go from zero RPM to steady state maximum RPM. The power a generator can provide at steady state, as used herein, refers to the power provided by the generator at steady state maximum output.

A bidirectional charger/discharger is preferably connected between the bus and the energy storage device. Energy storage device is any device that stores energy, such as, for example, a battery, a super capacitor, etc. The controller preferably receives feedback indicative of the amount of energy stored in the energy storage device.

Prior to initiating the welding process it is likely the engine is running at a reduced speed to save power. Thus, the engine control module preferably calls for an increased engine speed when a welding process is initiated. Initiating a welding process, as used herein, includes the initial drawing of current at the beginning of the weld.

If the welding type output is such that the engine cannot provide the needed power until the engine speed is increased, the controller preferably limits the welding type output, until the engine speed is increased.

A block diagram of a welding type system 100 is shown in FIG. 1 and includes a welding type power circuit 102, an auxiliary power circuit 104, a controller 106 and 107, an engine module 109, a generator module 110, a generator conditioning module 112, a battery or energy storage module 114 and an energy conditioner (or charger/discharger) 116.

Figure 3:
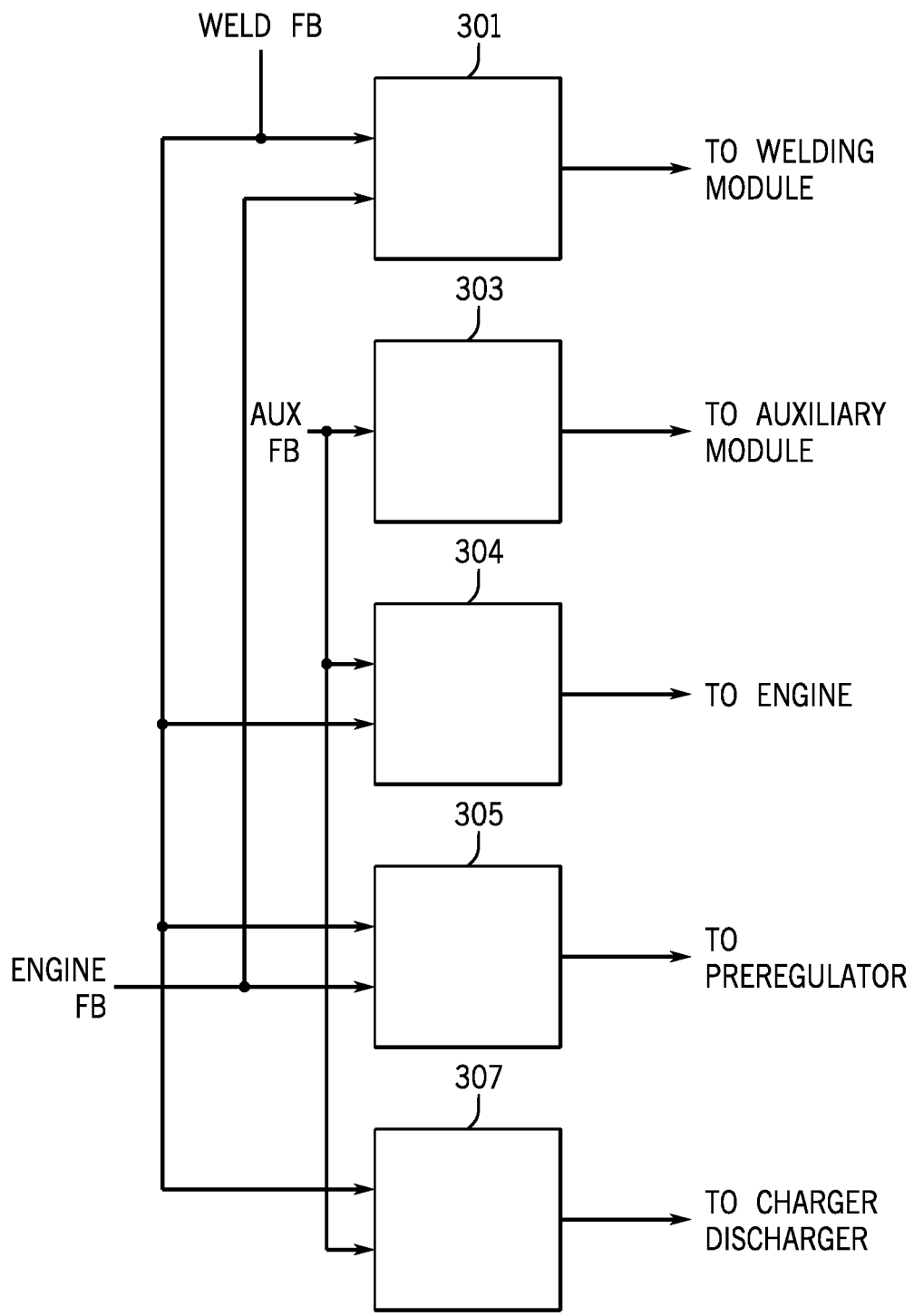
FIG. 3 is a block diagram of the controller shown in FIG. 1.

Controller 106 and 107 are shown in FIG. 3, and include a welding control module 301 that receives at least the welding type output feedback, an auxiliary control module 303 that receives at least the auxiliary feedback, engine control module 304 that receives at least the welding feedback and the auxiliary feedback, a preregulator control module 305 that receives at least the welding feedback and the engine feedback and a charge/discharge control module 307 that receives at least one of the auxiliary feedback and the welding feedback.

Welding control module 301 provides welding output control outputs as signals that control the switches in welding type power output circuit 102. The controller operates consistent with the prior art, but with the added control that if there is not sufficient power available (from the engine/generator and battery) to provide the power demanded by the welding operation, the commanded output power is reduced until the desired power is available. Preferably, battery module 114 makes the likelihood of the desired power being unavailable low. Welding control module 301 receives at least the welding feedback and provides the welding output control outputs to the welding type module 102 in response thereto, and can limit the welding-type output power in response to engine RPM.

Auxiliary control module 303 provides an auxiliary control output as control signals that control the switches in auxiliary power circuit 104. The controller operates consistent with the prior art, but with the added control that if there is not sufficient power available (from the engine/generator and battery) to provide the power demanded by the auxiliary operation, the commanded auxiliary output power is reduced until the desired power is available. Preferably, battery module 114 (or energy storage module) makes the likelihood of the desired power being unavailable low. Auxiliary control module 303 receives at least the auxiliary feedback and provides the an auxiliary control output to the auxiliary module 102, in response thereto.

Preregulator control module 305 provides preregulator control outputs as control signals that control the switches in preregulator power circuit 112. The controller operates consistent with the prior art, but with the added control that if there is not sufficient power available (from the engine/generator and battery) to maintain a desired bus voltage given the power demanded by the auxiliary and welding operations, the commanded auxiliary and welding type output power can be reduced until the desired power is available. Engine RPM feedback can be used to control the preregulator to avoid overloading the engine, by reducing preregulator voltage or limiting the power provided to the preregulator. The peak current drawn by or provided by the preregulator can be based on an algorithm or table and the engine. Preferably, battery module 114 makes the likelihood of the desired power being unavailable low. Preregulator control module 305 receives at least the welding feedback and the engine feedback and provides the preregulator control outputs to preregulator 112 in response thereto.

Engine control module 304 provides an engine control output as control signals to engine 109 that control the speed of engine 109. Engine 109 is preferably a variable speed engine, that provides motive power to generator 110. The speed of engine 109 is controlled to provide the combined desired welding type power and auxiliary power. By operating at the desired speed, energy is not wasted by the engine operating faster than necessary. Control module 304 preferably causes engine 109 to speed up shortly before the welding operation begins (i.e, when the trigger is pulled), so that the desired power is available when the welding operation does begin. Control module 304 can cause engine 109 to operate at a very low speed, or turn off, when welding type and auxiliary power are not desired. Also, control module 304 can cause engine 109 to operate at an efficient speed when there is no demanded output, to provide power to charge energy storage devices or batteries 114. If batteries 114 are kept charged, then power will be available when the next welding or auxiliary operation is started. Engine control module 304 receives at least the welding feedback and the auxiliary feedback and provides a control signal to engine 109 in response thereto, to control the RPM of engine 109.

Controller 107 also controls charger/discharger 116 using control module 307 so as to provide power from batteries 114 when the engine produces less power than being used by the welding module and the auxiliary module combined. Also, when the engine produces more power than being used by the welding module and the auxiliary module combined, module 307 causes charger/discharger 116 to charge batteries 114.

Figure 2:
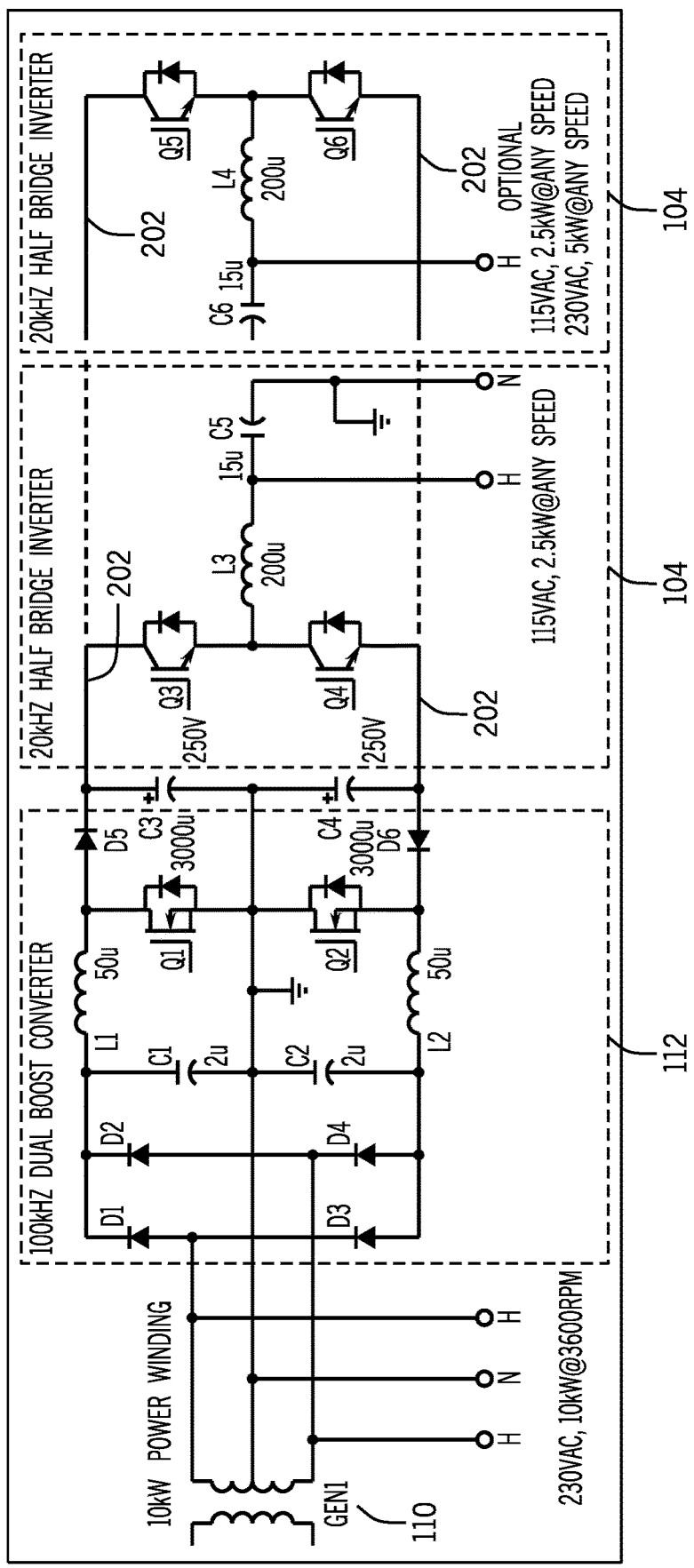
FIG. 2 is a circuit diagram of portions of the system of FIG. 1.

Generator conditioning module or preregulator 112 preferably includes a dual boost preregulator, as shown in FIG. 2. Dual boost preregulator 112 is connected to receive the generator output and to provide an intermediate signal to a bus. Preregulator 112 is operated at 100 KHz, in the preferred embodiment, and provides a common bus 202 for weld power module 102 and auxiliary power module 104. Control module 305 controls switches Q1 and Q2 to provide the desired bus voltage in a manner consistent with prior art boost circuits. Switches Q1 and Q2 can be controlled separately, so as to maintain a balanced bus. Dual boost circuit preregulator, as used herein includes, is a circuit that receives an input and provides two boosted outputs, one across a common and positive bus, and the other across the common and a negative bus. Common bus, as used herein includes, a bus that is used to power multiple parallel outputs.

Preregulator 112 runs at other frequencies, and has other topologies in various embodiments. Preregulator 112 can be replaced by a different input circuit. Input circuit, as used herein, includes circuits configured to receive an ac input signal and to provide a dc output signal and may include as part thereof a rectifier, a transformer, a saturable reactor, a converter, an inverter, a filter, and/or a magnetic amplifier.

Common bus 202 from preregulator 112 is provided to auxiliary power circuits 104, and is preferably maintained at 500V to allow the use of 600V switches. The embodiment shown in FIGS. 2 and 4 includes two auxiliary power circuits 102, although one or more than two auxiliary outputs may be provided (and/or at different voltage and frequencies. Auxiliary power circuits 102 are preferably half-bridge inverters operated at 20 KHz to produce a synthetic 115 VAC, 60 Hz, output. The outputs can be stacked to provide 230 VAC. The desired 60 Hz output can be produced at any engine speed because auxiliary control module 303 controls switches Q3-Q6 to produce the desired 60 Hz signal from common dc bus 102, independent of the engine speed and generator frequency. Other embodiment include other auxiliary power topologies, including transformer based circuits that have an output frequency dependent on the generator frequency.

Figure 4:
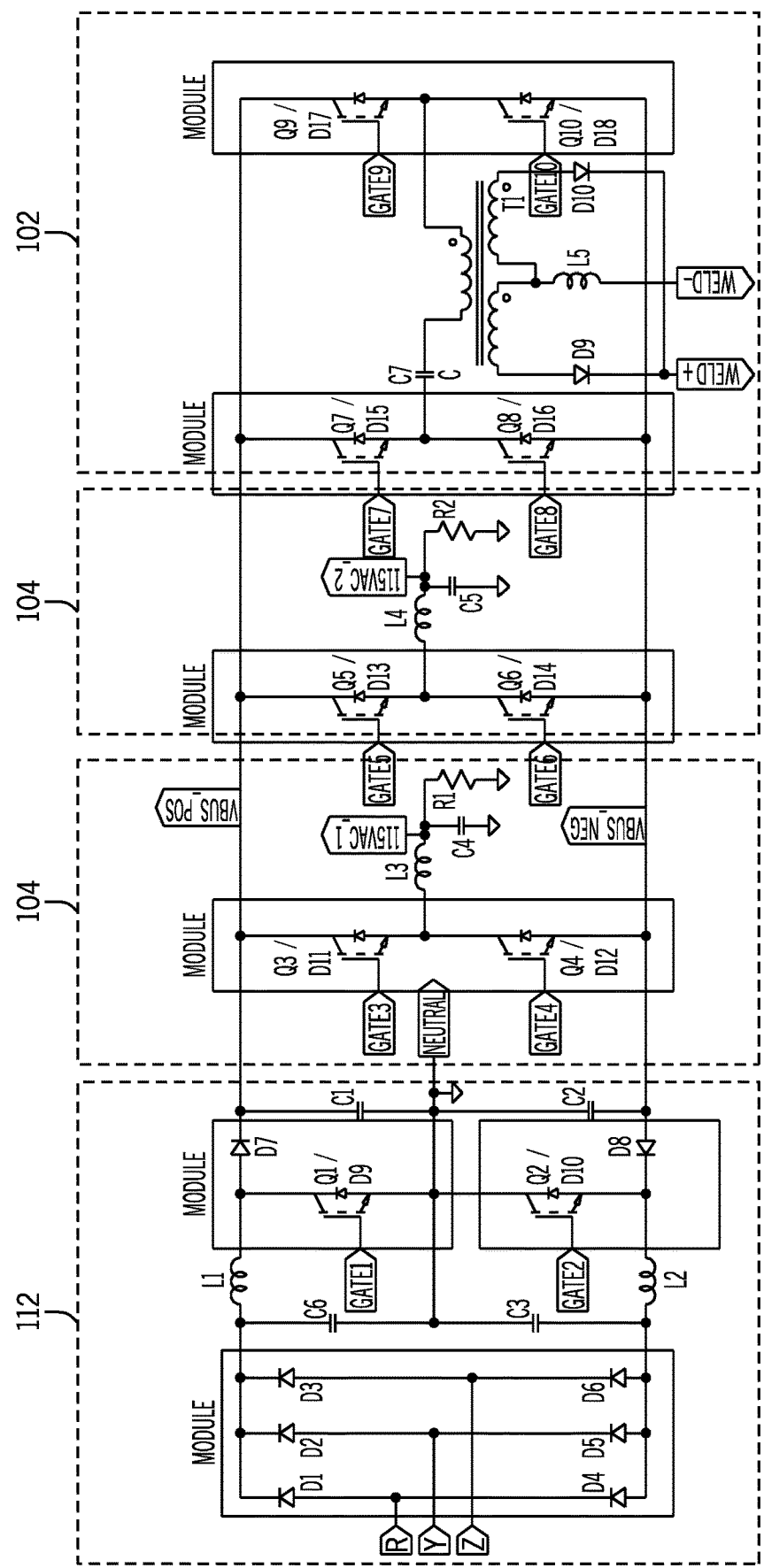
FIG. 4 is a circuit diagram of portions of the system of FIG. 1.

Common bus 202 from preregulator 112 is also provided to welding-type power circuit 102, shown in detail in FIG. 4. Welding-type power circuit 102 is preferably an inverter based circuit that drives a transformer output. The embodiment of FIG. 4 is a full bridge inverter, operated at 20 KHz, feeding a primary side of a transformer, with a center tapped secondary side, to provide an output of up to 280 A at 32V. Welding control module 301 controls switches Q7-Q10 to produce the desired output independent of the engine speed and generator frequency. Other embodiments include other welding-type power circuit topologies.

Controller 106 and 107 control the system to operate efficiently. Preferably, when the instantaneous power being produced by the engine and generator exceeds the instantaneous power needed for the welding type power output and the auxiliary power output, the excess energy is stored when controller 106 causes battery conditioning module 116 to charge batteries 114. Controller 106 can do so in response to feedback from the engine (such as RPM) and/or generator, and welding-type output, and the auxiliary output. For example, when running at steady state the power produced may be more than that need, or when the load suddenly decreases, the power produced will exceed the power needed until the engine speed is reduced. That excess energy is stored, rather than dissipated or otherwise lost. Energy can be captured after a welding or auxiliary operation ends, and the engine speed is decreasing. Also, because welding can be an intermittent operation, energy can be stored between welds. Controller 106 can received feedback indicative of the amount of energy stored in the energy storage device 114. Thus, controller 106 and 107 can cause engine 109 to produce more power when it is needed to charge batteries 114.

Also, controller 106 can cause charger/discharger module 116 to draw power from batteries 114 and provide that power to module 112, which boosts it and provides it as available power on bus 202. For example, at start up (of the welding or auxiliary operation) the engine might be running at a low speed (or off), and during the time it takes for the engine to ramp up to the operating speed, power can be provided by batteries 114. Similarly, when the load suddenly increases, charger/discharger 116 can provide power from batteries 114 to preregulator 112 while the engine speed increases.

Energy storage module 114 preferably includes batteries such as lead acid batteries, LI-ion batteries, or other battery types, and/or includes super capacitors. Batteries 114 preferably can store sufficient energy to start the welding process while the engine ramps up to speed. For example, if the energy storage device is able to store an amount of energy that is at least half of the energy the generator can provide at steady state for a start-up duration, then the combination of the battery and engine (starting at a low speed or off and increasing in speed) should be able to provide the energy needed to start the welding process. Alternatives provide for batteries 114 to provide sufficient energy to start the welding process without power from the engine.

Numerous modifications may be made to the present disclosure which still fall within the intended scope hereof. Thus, it should be apparent that there has been provided a method and apparatus for an engine driven welding type system that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding-type power supply, comprising:
   a variable speed engine that provides motive power;
   a variable frequency generator that is connected to receive the motive power, and that provides a generator output;
   a preregulator connected to the generator output, and connected to provide an intermediate signal to a bus;
   a welding-type output power circuit disposed to receive power from the bus and provide a welding-type output power;
   an auxiliary power circuit, disposed to receive power from the bus and to provide an auxiliary output power; and
   a controller comprising circuitry configured to:
      receive welding feedback indicative of the welding-type output power,
      receive auxiliary feedback indicative of the auxiliary output power, and
      receive engine feedback indicative of the engine RPM, the controller comprising:
         a welding control output connected to the welding-type output power circuit;
         an auxiliary control output connected to the auxiliary power circuit;
         an engine control output connected to the engine;
         a preregulator control output connected to the preregulator;
         a welding control module comprising circuitry configured to:
            receive at least the welding feedback,
            provide a control signal to the welding control output in response to the welding feedback, and
            limit the welding-type output power in response to engine RPM;
         an auxiliary control module comprising circuitry configured to:
            receive at least the auxiliary feedback,
            provide a control signal to the auxiliary control output in response to the auxiliary feedback, and
            limit the auxiliary output power in response to engine RPM;
         an engine control module comprising circuitry that-configured to:
            receive at least the welding feedback and the auxiliary feedback, and
            provide a control signal to the engine control output in response to at least one of the welding feedback or the auxiliary feedback; and
         a preregulator control module comprising circuitry configured to:
            receive at least the welding feedback and the engine feedback, and
            provide a control signal to the preregulator control output in response to at least one of the welding feedback or the engine feedback, and
            selectively limit the preregulator output power based on the engine RPM to avoid overloading the engine.

2. The welding-type power supply of claim 1, further comprising:
- an energy storage device; and
- a bidirectional charger/discharger connected between the bus and the energy storage device.

3. The welding-type power supply of claim 1, wherein the controller includes a user override input provided to the engine control module, wherein the engine control module causes the engine to run at a steady state maximum RPM.

4. The welding-type power supply of claim 1, wherein the engine control module calls for an increased engine speed when at least one of a welding process and an auxiliary process is initiated.

5. The welding-type power supply of claim 4, wherein the controller limits at least one of the welding process and the auxiliary process if the engine speed is less than a desired speed.

6. The welding-type power supply of claim 2, wherein the controller is further connected to cause energy stored in the energy storage device to be provided to the bus.

7. The welding-type power supply of claim 2, wherein the energy storage device includes at least one of a battery, a lead acid battery, and a capacitor.

8. The welding-type power supply of claim 6, wherein the energy storage device is able to store an amount of energy that is at least as much as an acceleration deficit for at least one of: accelerating from off to an idle speed, accelerating from off to a steady state maximum speed, and accelerating from the idle speed to the maximum steady state speed.

9. The welding-type power supply of claim 6, wherein the energy storage device is able to store an amount of energy that is at least as much as a hot start energy.

\* \* \* \* \*